United States Patent [19]

Wienand et al.

[11] 4,377,280
[45] Mar. 22, 1983

[54] CYLINDRICAL HELICAL COMPRESSION SPRING

[75] Inventors: Josef Wienand; Horst Beihammer, both of Werdohl, Fed. Rep. of Germany

[73] Assignee: Stahlwerke Brüninghaus Gesellschaft mit beschränkter Haftung, Werdohl, Fed. Rep. of Germany

[21] Appl. No.: 107,577

[22] Filed: Dec. 27, 1979

[30] Foreign Application Priority Data

Dec. 29, 1978 [DE] Fed. Rep. of Germany ....... 2856632

[51] Int. Cl.³ ............................................. F16F 1/06
[52] U.S. Cl. .................... 267/180; 267/61 R; 267/167
[58] Field of Search .................... 267/61 R, 166, 167, 267/176, 180, 4, 61 S

[56] References Cited

U.S. PATENT DOCUMENTS

| 485,652 | 11/1892 | Pfingst | 267/61 R |
| 2,485,978 | 10/1949 | McCandless et al. | 267/61 X |
| 2,524,480 | 10/1950 | Schenk | 267/61 X |
| 4,077,619 | 3/1978 | Borlinghaus | 267/166 |

FOREIGN PATENT DOCUMENTS 301075 10/1929 United Kingdom ............ 267/61 R

Primary Examiner—Ralph J. Hill
Attorney, Agent, or Firm—Spencer & Kaye

[57] ABSTRACT

A cylindrical helically coiled compression spring made of a length of wire or rod having a circular cross section, the spring having interior windings providing the main spring action and end winding portions at least one of which is arranged to be supported against a spring disc, and the wire rod being formed to have a diameter which is greater in the region of the at least one end winding portion than in the region of the interior windings.

3 Claims, 4 Drawing Figures

CYLINDRICAL HELICAL COMPRESSION SPRING

BACKGROUND OF THE INVENTION

The present invention relates to a cylindrical helical compression spring of the type formed from a wire or rod having a circular cross section whose ends are supported against spring discs.

Helical compression springs are known in which the wires or rods employed for their manufacture have a constant circular cross section over their entire length. The end windings of these springs are particularly in danger of breaking, mainly at those points where they lift off from the spring discs. At these points, which in theory constitute the clamping points of the helical spring, there occur, during use, rolling and friction movements between the end windings and the spring discs. After a short time these movements destroy the corrosion protection layer of the spring wire and its outer layer, which has been reinforced by shot peening and loaded with internal pressure stresses.

If the end windings of helical vehicle chassis springs are designed according to DIN (German Industrial Standard) 2096, page 1, FIG. 3, and spring discs as shown in part 2 of this standard, at page 2, FIG. 1, are used the end winding unavoidably come into contact with the immediately adjacent highly stressed spring active windings not only when the theoretical blocking force of the spring has been reached but already at lower forces which still lie in the operating range of the spring. This also produces the already mentioned damage to the wire surface and additionally the contact between windings produces noise. The main cause of the early contact between the windings in the prior art springs is a heavy deformation of the end windings which, only in theory, are considered to be rigid.

SUMMARY OF THE INVENTION

It is an object of the present invention to reduce the stresses and the deformation of the end and transition windings of a helical compression spring with respect to the windings which provide the major spring action.

Further objects of the invention are to reduce the danger of corrosion breaks and avoid noise development.

These and other objects are accomplished according to the present invention, by making the wire diameter in the region of at least one end winding greater than in the regions of the windings providing the major spring action.

According to preferred embodiments of the invention, the winding diameter of at least one end winding is made smaller than the winding diameter of the windings which provide the major spring action.

DESCRIPTION OF THE PREFERRED EMBODIMENTS

Figure 1:
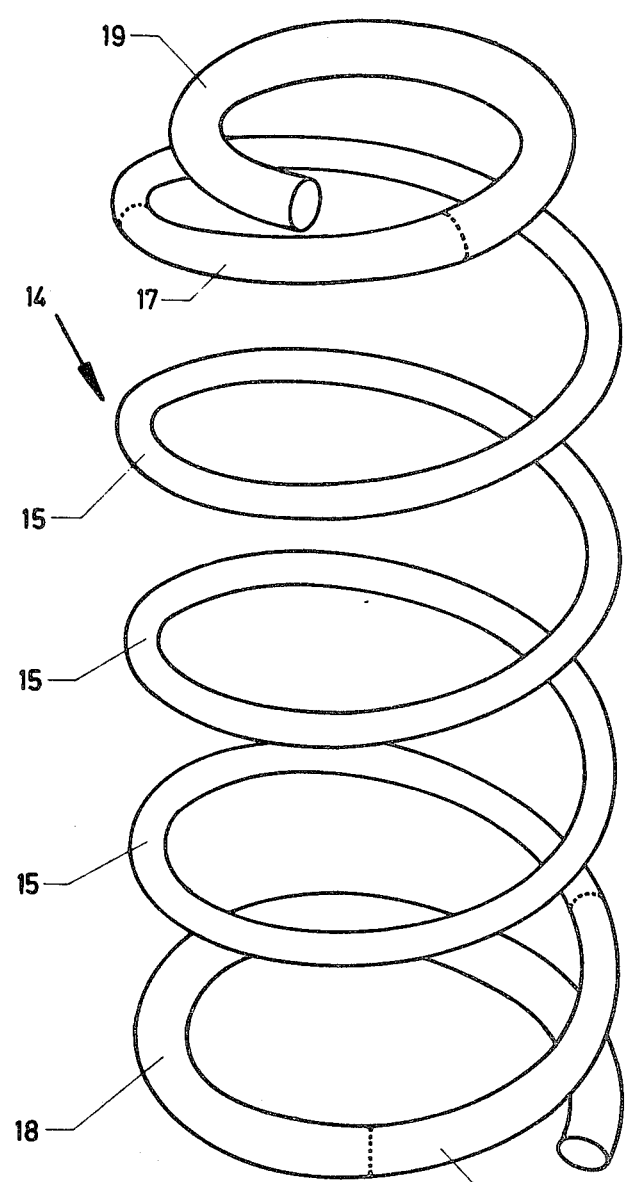
FIG. 1 is a perspective view of one preferred embodiment of a cylindrical helical compression spring according to the invention.
Figure 2:
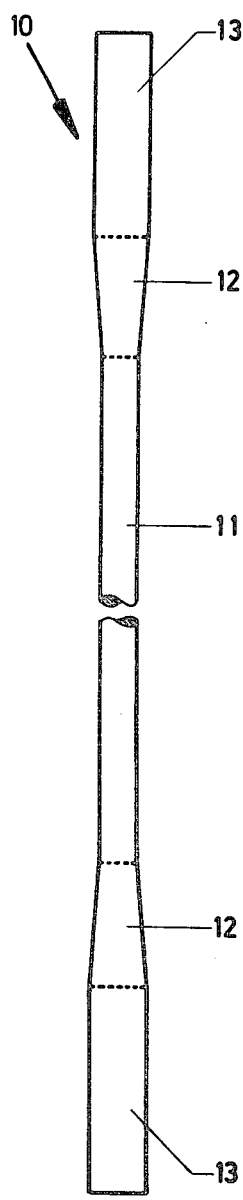
FIG. 2 is an elevational view of the spring wire of the helical compression spring of FIG. 1 before shaping.

The spring wire 10 of the helical compression spring shown in FIGS. 1 and 2 includes a major region 11 constituting the major part of the length of the wire and having a constant diameter. At both ends of this major region 11 there follow transition regions 12 where the diameter of the wire increases progressively toward the wire ends until they merge into end regions 13 having constant diameters. The wire diameters of the end regions 13 are greater than the wire diameter of the major region 11.

In the wound state, the spring wire 10 forms the cylindrical helical compression spring 14 shown in FIG. 1, which spring is composed of windings 15 providing the main spring action, transition windings 16 and 17 disposed at the ends of the main windings 15 and end windings 18 and 19.

The diameter of the spring windings is the same for the main windings 15 providing the main spring action, while the winding diameter of the upper end winding 19 is smaller. Thus, the upper transition winding 17 has a progressively varying radius of curvature, while that of the lower transition winding 16 is constant.

Figures 3, 4:
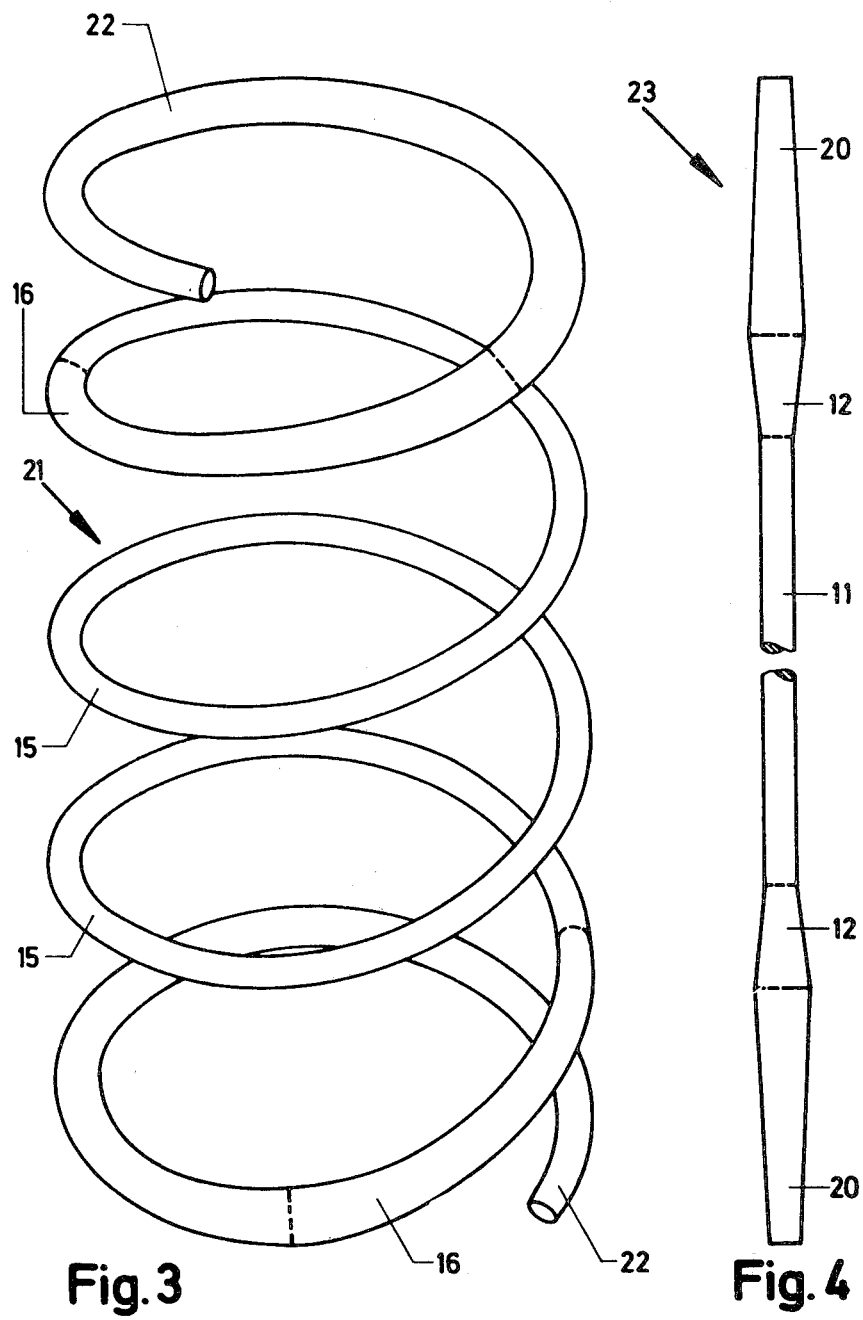
FIG. 3 is a perspective view of a further preferred embodiment of a cylindrical helical compression spring according to the invention.
FIG. 4 is an elevational view of the spring wire of FIG. 3 before shaping.

The spring shown in FIGS. 3 and 4 of the drawings is basically of the same design but has a variable wire diameter in the end regions 20 of the spring wire 23, decreasing toward the ends from the transition regions 12. The transition winding portions 16 of the resulting helical compression spring 21 shown in FIG. 3 are followed by end windings 22 with a constant winding diameter exactly equal to the winding diameter of the winding 15 providing the main spring action.

Each end winding may be provided with a planar surface, normal to the axis of the spring helix, at the respective frontal face of the helical compression spring 14 or 21 in order to support the spring against planar spring discs.

Helical compression springs according to the present invention can be used as springs in motor vehicle chassis and may preferably have a linear spring characteristic. If the end windings resting on the spring discs roll during the spring action or experience frictional sliding movement relative to the spring discs, damage to the spring surface will no longer result in breaks because the thickened wire provided at the spring ends by the present invention results in a reduction of stresses. If, for example, a wire having a diameter of 11 mm in the major region 11 providing the main spring action is thickened to 12 mm, at the outer ends of transition regions 12, the stresses in the thickened area are decreased by 23% compared to the stresses in the area providing the main spring action.

In order to save material, the end regions may be designed as shown in FIGS. 3 and 4 of the drawings, i.e. with a wire diameter which decreases toward the outside, if the other structural parameters permit this.

In the helical compression spring according to the present invention the regions of the end windings are not only subjected to reduced stresses but at the same time also possess an increased deformation resistance. An increased deformation resistance has a positive effect in two respects. Firstly, it contributes substantially to the fact that, in the active area of the spring, the end windings no longer come into contact with the adjacent windings providing the main spring action and secondly, it improves the kinking and buckling behavior of the spring.

It is to be understood that the above description of the present invention is susceptible to various modifications, changes and adaptations, and the same are intended to be comprehended within the meaning and range of equivalents of the appended claims.

What is claimed is:

1. In a cylindrical helically coiled compression spring made of a length of wire or rod having a circular cross section, the spring having interior windings providing the main spring action and end winding portions each of which is arranged to be supported against a spring disc, and the wire or rod having a diameter which varies over the length thereof and is constant over the entire length of the interior windings, the improvement wherein said wire or rod is formed to have a diameter which is greater in the region of both said end winding portions than in the region of said interior windings, and the coil diameter of at least one said end winding portion is no greater than that of said interior windings.

2. Helical compression spring as defined in claim 1 wherein the diameter of said wire or rod is constant in the region of each said end winding portion.

3. Helical compression spring as defined in claim 1 further comprising a transition winding portion extending between said interior windings and said at least one end winding portion, and wherein the diameter of said wire or rod in the region of said at least one end winding portion decreases progressively from said transition winding portion to the associated end of said spring.

* * * * *